United States Patent Office 2,927,088
Patented Mar. 1, 1960

2,927,088

METHOD FOR MANUFACTURING CATALYSTS

Edward Michalko, Chicago, James Hoekstra, Evergreen Park, and Robert M. Smith, Berwyn, Ill., assignors, by mesne assignments, to Universal Oil Products Company, Des Plaines, Ill., a corporation of Delaware No Drawing. Application November 29, 1956
Serial No. 624,995

8 Claims. (Cl. 252—466)

The present invention is relative to a method for manufacturing metal-containing catalysts and is specifically directed to a method for manufacturing catalysts comprising platinum.

Metal-containing catalytic composites have acquired extensive commercial utility in industries such as the pharmaceutical, detergent, petroleum, insecticidal, etc. These industries utilize catalysts to promote a multitude of reactions, among which are hydrogenation, cyclization, isomerization, cracking, polymerization, dehydrogenation, sulfonation, oxidation and hydrocracking, etc. Whatever the industry, and the reaction or reactions involved, it is essential that the particular catalyst employed exhibit a high degree of activity as well as prolonged capability to function economically.

Until recently, the more desirable catalysts, those catalysts containing noble and precious metals such as platinum, palladium, silver, gold, etc., were not obtained economically due to the high cost of the catalytically active metal component. New discoveries in the field of catalysis, however, have made possible the manufacture of highly active catalytic composites which comprise small quantities, in some instances as little as 0.01% to 1% by weight, of noble and precious metals.

The object of the present invention is to produce metal-containing catalytic composites which exhibit a high degree of activity hereofore not obtained, and which have the stability necessary for prolonged periods of acceptable performance. The object of the present invention is specifically directed towards catalytic composites which comprise noble and precious metals, the relative high cost of which enhance the present method whereby a highly active, stable catalyst is produced which contains lesser quantities of the noble or precious metals.

In one embodiment, the present invention provides a method for manufacturing a metal component-refractory inorganic oxide catalyst which comprises commingling an organic sequestering agent with said refractory inorganic oxide prior to compositing the metal component therewith.

In another embodiment, the present invention provides a method for manufacturing an alumina catalyst containing a group VIII metal component which comprises commingling an organic sequestering agent with said alumina, adding thereto the group VIII metal component, drying the resulting mixture at a temperature of from about 100° F. to about 210° F. and thereafter subjecting said mixture to air-oxidation effected at a temperature of from about 800° F. to about 1200° F.

In a specific embodiment, the present invention provides a method for manufacturing alumina-platinum catalyst which comprises commingling an aqueous solution of chloroplatinic acid with an aqueous solution of oxalic acid in a weight ratio of oxalic acid to platinum in excess of about 1:2 in the presence of ammonia, combining the resulting mixture with alumina, drying the alumina-platinum composite at a temperature of from about 100° F. to about 210° F. and thereafter subjecting the dried composite to air-oxidation at a temperature of from about 800° F. to about 1200° F.

Although the method of the present invention is specifically directed to catalytic composites containing platinum and/or palladium, catalytic composites containing other metals can be improved through its use. Other metals, particularly metals from groups VI and VIII of the periodic table, can be composited with a refractory inorganic oxide and subsequently employed therewith as components of a catalyst, with or without platinum or palladium present, and can be improved by the method of the present invention. Catalytic composites which can be improved by the method of the present invention comprise metals such as, but not limited to, cesium, vanadium, chromium, tungsten, cobalt, copper, sodium and other alkali metals, silver, gold, iridium, rhodium, rhenium, ruthenium, molybdenum, nickel, osmium, mixtures of two or more, etc. The metal component may exist either in the elemental state or in combination as the halide, oxide, nitrate, sulfate, etc.

Generally, the amount of the metal component composited with the catalyst is small compared to the quantities of the other components combined therewith. For example, platinum and/or palladium comprises from about 0.01% to about 5% by weight of the total catalyst, and usually from about 0.1% to about 1% by weight. The use of other metal components, with or without platinum and/or palladium, is dependent upon the use for which the particular catalyst is intended. In any case, however, the concentrations of the metal components will be small, and will generally be within the range of from about 0.01% to about 5% by weight of the total catalytic composite.

Halogen is generally composited with the catalyst in concentrations of from about 0.01% to about 8% by weight of the total catalyst, and may be either fluorine, chlorine, iodine, bromine, or mixtures of the same. In general, fluorine appears to be less easily removed from the catalyst, and is, therefore, preferred in many instances. It is understood that the halogen may comprise a mixture of two or more of the aforementioned halogens; a particularly preferred mixture comprises fluorine and chlorine. The halogen is combined with one or more of the other components of the catalyst, and is generally referred to as combined halogen.

Whatever the metal component, it is usually composited with a highly refractory inorganic oxide such as alumina, silica, zirconia, magnesia, boria, thoria, strontia, etc., and mixtures of two or more including silica-alumina, alumina-boria, silica-thoria, silica-alumina-zirconia, etc. It is understood that the refractory inorganic oxides hereinabove set forth are intended to be illustrative rather than limiting on the scope of the present invention. It is further understood that these refractory inorganic oxides may be manufactured by any suitable method including separate, successive, or co-precipitation methods of manufacture, or they may be naturally occurring substances such as clays or earths which may be purified or activated with special treatment.

In the interest of simplicity, the following discussion will be limited to catalytic composites comprising platinum and alumina, with or without combined halogen contained therein. It is understood, however, that other catalytic composites may be benefited by the method of the present invention, although not with equivalent results, and that such catalytic composites need not necessarily contain platinum and/or alumina.

In the present specification and appended claims, the term alumina is employed to mean porous aluminum oxide in all states of oxidation and in all states of hydration, as well as aluminum hydroxide. The alumina may be synthetically prepared or naturally occurring and it may be of the crystalline or gel type. Whatever type of alumina is employed, it may be activated prior to use by one or more treatments including treatment with acids, alkalis or other chemical compounds, drying, calcining, steaming, etc. It may be in a form known as activated alumina, activated alumina of commerce, porous alumina, alumina gel, etc. The various forms of alumina are known by many trivial and trade names and it is intended to include all such forms. The typical aluminas hereinabove set forth is intended as illustrative rather than limiting on the scope of the present invention.

The alumina may be made in any suitable manner, a typical one being to digest a large excess of aluminum metal with a dilute aqueous solution of hydrogen chloride. In another method, a solution of an alumina salt, particularly aluminum chloride, may be electrolyzed in an electrolytic cell having a porous partition between the anode and the cathode. In one of the more common methods of manufacturing alumina, an alumina sol is prepared by adding aluminum metal to an aqueous solution of aluminum chloride, which mixture is then subjected to heating and digesting at its boiling point. The temperature in general will range from about 175° F. to about 220° F. The length of time involved in heating and digesting is dependent upon the purity and the particle size of the aluminum metal employed.

A preferred form of alumina is the sphere, and alumina spheres may be continuously prepared by passing droplets of the alumina sol into an oil bath maintained at an elevated temperature, retaining the droplets in said oil bath until the droplets set to hydrogel spheres. The hydrogel spheres are continuously withdrawn from the oil bath and are immediately thereafter subjected to an aging treatment to impart to them certain desired physical characteristics. The spheres, after aging, are generally dried at a temperature of from about 300° F. to about 800° F., and thereafter subjected to a calcining treatment effected at a temperature of from about 800° F. to about 1200° F. The calcined spheres may then be combined with the non-metallic components of the catalytic composite such as halogen, sulfate, nitrate, oxide, etc., if said components have not already been composited therewith. It is understood that the catalytic components may be added either before or after the calcining treatment, and in some instances, after the addition of the catalytically active metal component.

Prior to the addition of the metal component, the calcined alumina spheres are treated with an organic sequestering agent. In some instances, the organic sequestering agent may be combined with the metallic component, and the resulting mixture then added to said spheres. For example, platinum is usually composited with alumina as an aqueous solution of chloroplatinic acid. For ease in handling and metering, the organic sequestering agent is admixed with the chloroplatinic acid in the desired quantity, and the resulting mixture is combined with the alumina spheres. The term sequestering agent, as employed in the present specification and the appended claims, is meant to denote a substance which retards the deposition of platinum onto the alumina by forming a complex with said platinum, thereby retaining the platinum in some form of suspension until such time as the platinum has thoroughly penetrated the alumina sphere. The sequestering agent is subsequently removed in further processing treatments as hereinafter set forth.

The organic sequestering agent may be employed in any suitable quantity and/or concentration, although it is preferred to utilize an amount of organic sequestering agent which is equal to a weight ratio of organic sequestering agent to platinum, or to other metal components, in excess of about 1:2. However, the organic sequestering agent should not be employed in excess of that amount which is economically justified. Generally, weight ratios of from about 1:2 to about 5:1 or more may be advantageously employed although an upper limit of about 2:1 to about 3:1 is preferred.

Suitable organic sequestering agents for use in the method of the present invention include those organic compounds which readily form metal chelates. It is preferred that the sequestering agent selected is one which is easily removed from the catalytic composite, and which does not result in the deposition of undesirable contaminants therein. Suitable organic sequestering agents include citric, acetic, oxalic, tartaric, tetracetic and other organic acids, ethylene diamine, $\beta$-diketones, $\beta$-dicorbonyls, etc. The organic sequestering agent may be employed in mixtures of two or more, and may be diluted with any suitable solubilizing substance such as water, alcohol, acetone, etc. Citric acid and oxalic acid are the preferred organic sequestering agents to be used in the method of the present invention, and it has been found that oxalic acid is particularly preferred.

As hereinbefore set forth, the organic sequestering agent may be mixed with the metal component or mixed with the alumina prior to the addition of the metallic component therewith. In any case, it is preferred that the metallic component is not combined with the alumina prior to the addition of the organic sequestering agent. The presence of ammonia, or some other suitable compound of similar basicity, to raise the pH level of the mixture to about 3.5 appears to be beneficial.

The resulting mixture of alumina, platinum, sequestering agent and ammonia is subjected to drying effected at a temperature of from about 100° F. to about 210° F. The temperature level is maintained until all the solution has evaporated and the spheres are dried. The dried spheres are then subjected to an oxidizing treatment effected at a temperature of from about 800° F. to about 1200° F. in the presence of a free oxygen-containing gaseous medium. Any suitable free oxygen-containing gas may be employed. Air is preferred due to its natural abundance and the economic advantage afforded through its utilization.

In accordance with the preferred method of the present invention for manufacturing metal-containing catalytic composites, an organic sequestering agent is admixed with an aqueous solution of a salt of said metal component in a weight ratio of organic sequestering agent to the metal component in excess of 1:2. To the resulting solution is added a sufficient quantity of ammonia, or some other compound of similar basicity, to raise the pH of the mixture to about 3.5. The sequestering agent-metal component-ammonia solution is then combined with the selected refractory inorganic oxide. The temperature of the resulting mixture is raised to a level of from about 100° F. to about 210° F., and is maintained at this level until all of the solution has evaporated and the mixture is substantially dry. The mixture is then subjected to an air-oxidizing treatment effected at a temperature of from about 800° F. to about 1200° F. for a period of about 3 hours or more.

Briefly, the preferred method of the present invention comprises commingling an aqueous solution of oxalic acid and chloroplatinic acid in a weight ratio of oxalic acid to platinum in excess of 1:2. To the resulting solution is added a sufficient quantity of ammonia to raise the pH of the solution to about 3.5. The resulting mixture is then combined with alumina spheres containing combined halogen. The alumina-platinum-combined halogen composite is then subjected to drying at a temperature of from about 100° F. to about 210° F., and thereafter to air-oxidation effected at a temperature of from about 800° F. to about 1200° F. for a period of about three hours or more.

The following examples are introduced to further illustrate the novelty and utility of the present invention, and to indicate the benefits afforded the manufacturing of catalysts through the use thereof. It is not intended, however, to limit unduly the present invention to the conditions, materials and concentrations employed.

The alumina employed in the examples illustrating the method of the present invention was prepared by digesting an excessive amount of aluminum metal in an aqueous solution of 12% by weight of hydrogen chloride. The sol was commingled with water to yield an alumina sol solution comprising 12% by weight of aluminum. An aqueous solution of hydrogen fluoride was mixed with the alumina sol to give an 0.5% fluoride concentration based on the final weight of alumina produced by the alumina sol. The alumina sol solution was then commingled with an aqueous solution of hexamethylenetetramine, which mixture was then passed into a small mixer having a baffle rotated by a small motor. Droplets were emitted from the bottom of the mixer into the top of a forming tower two inches in diameter and five feet long. The forming tower was filled with a paraffinic hydrocarbon oil boiling over 400° F., and was maintained at a temperature of 203° F. by means of electrical heating elements. The resulting alumina hydrogel spheroids were then aged in the same oil at a temperature of 203° F. for a period of about 16 hours.

The partially aged spheres were then further aged in an aqueous solution of concentrated ammonium hydroxide for a period of about 24 hours at a temperature of 203° F. The aged spheres were then thoroughly washed with distilled water, dried at a temperature of 248° F., and immediately calcined thereafter at a temperature of 1200° F.

EXAMPLE I

To 100 grams of the alumina spheres, prepared in the manner previously described, was added an aqueous solution containing 0.75 gram of citric acid. An aqueous solution of chloroplatinic acid containing 0.375 gram of platinum in 171 milliliters of water was then poured over the alumina spheres. The temperature of the mixture was raised to about 185° F., and was maintained at this level until all the solution had evaporated and the spheres were dry. The resulting catalytic composite was then oxidized in a stream of air for a period of about three hours at a temperature of 900° F.

A portion of the catalyst was analyzed to determine the final composition, and was found to contain 0.375% by weight of platinum, 0.09% by weight of combined chloride and 0.44% by weight of combined fluoride. The catalyst was subjected to a particular hydrocracking activity test which consists of passing a low naphthene, low aromatic, standard hydrocarbon charge stock through the catalyst at a temperature of 900° F., under a pressure of 500 p.s.i.g., a hydrogen to hydrocarbon mol ratio of three and a liquid hourly space velocity (defined as volumes of oil charged per hour per volume of catalyst) of two. The conditions set forth were maintained for a period of twenty hours, and the product effluent was collected throughout this entire period.

Another 100-gram portion of the alumina spheres was covered with an aqueous solution of chloroplatinic acid containing 0.75 gram of platinum in 171 milliliters of water. The temperature of the mixture was raised to 185° F., and maintained at this temperature until all the solution had evaporated and the spheres were dry.

A portion of the catalyst was analyzed to determine its final composition, and was found to contain 0.75% by weight of platinum, 0.13% by weight of combined chloride and 0.43% by weight of combined fluoride. The catalyst was subjected to the activity test previously described.

The results of the activity test conducted on the catalysts prepared as hereinabove set forth are shown in the following Table I. In addition, the catalysts, after the activity test had been completed, were analyzed to determine the quantity of coke deposited thereon as a result of said activity test.

*Table I*

| Sequestering Agent | Citric Acid | None |
|---|---|---|
| Presence of Ammonia | No | No |
| Platinum, wt. percent | 0.375 | 0.75 |
| Chloride, wt. percent | 0.09 | 0.13 |
| Fluoride, wt. percent | 0.44 | 0.43 |
| Activity Test Data: Octane Rating, Research Method | 85.0 | 85.0 |
| Vol. percent @ 212° F. plus less | 14.9 | 14.2 |
| Carbon Deposition, wt. percent | 1.19 | 1.92 |

Example I clearly indicates the degree of improvement afforded through the use of the method of the present invention. The citric acid-treated catalyst, although containing 50% by weight of the catalytically active metal component, was equally as active as the catalyst prepared by standard methods of manufacture. In addition, there was a decrease of approximately 40% by weight in the quantity of carbonaceous material deposited upon the catalyst even though the catalysts had been in service for identical periods of time at identical conditions.

EXAMPLE II

To a 100-gram portion of the alumina spheres was added an aqueous solution of 0.75 gram of citric acid. An aqueous solution of chloroplatinic acid containing 0.375 gram of platinum per 171 milliliters of water was then poured over the alumina sphere-citric acid mixture. The temperature was raised to 185° F. and maintained at this level until all the solution had evaporated, and the spheres were dry. The resulting catalytic composite was then subjected to oxidation in a stream of air for a period of about three hours at a temperature of 900° F. The final catalytic composite was found to contain 0.375% by weight of platinum, 0.09% by weight of combined chloride and 0.44% by weight of combined fluoride.

The catalyst was then subjected to a specific catalyst evaluation test which comprises passing a standard hydrocarbon charge stock having a boiling range of about 240° F. to about 385° F. through the catalyst at a temperature of 932° F., under a pressure of 400 p.s.i.g., a hydrogen to hydrocarbon mol ratio of six and a liquid hourly space velocity of 4.0.

A second catalyst was prepared, as hereinabove described, with the addition of 0.3 gram of ammonia to a solution of chloroplatinic acid and citric acid, thereby raising the pH of the mixture to 3.5. The resulting mixture was then poured over the alumina spheres; the temperature was increased to 185° F., and maintained at this level until the spheres were dry. The spheres were oxidized in a stream of air at a temperature of 900° F. for a period of three hours. The final catalytic composite contained 0.375% by weight of platinum, 0.10% by weight of combined chloride and 0.44% by weight of combined fluoride.

The catalyst was subjected to the evaluation test previously described, the results of which are given in the following Table II along with the results of the test performed on the catalyst made in the absence of ammonia.

*Table II*

| Sequestering Agent | Citric Acid | Citric Acid |
|---|---|---|
| Presence of Ammonia | No | Yes |
| Platinum, wt. percent | 0.375 | 0.375 |
| Chloride, wt. percent | 0.09 | 0.10 |
| Fluoride, wt. percent | 0.44 | 0.44 |
| Octane Rating, Research Method | 72.0 | 74.0 |
| Carbon Deposition, wt. percent | 0.34 | 0.36 |

Example II illustrates the additional advantages afforded through the method of the present invention when effected in the presence of a small quantity of ammonia.

EXAMPLE III

Two catalytic composites were made utilizing an aqueous solution of chloroplatinic acid containing 0.640 gram of platinum per 171 milliliters of water. One of the composites was mixed with an aqueous solution of 1.28 grams of citric acid, and the second composite with 1.28 grams of oxalic acid. Neither catalyst was made in the presence of ammonia.

The catalysts were separately subjected to a particularly severe catalyst evaluation test which consisted of passing a standard hydrocarbon charge stock through the catalyst at a temperature of 941° F., a pressure of 500 p.s.i.g., a hydrogen to hydrocarbon mol ratio of 10.4 and a liquid hourly space velocity of 1.99.

The results of the activity tests are given in the following Table III along with the final composition of each catalyst.

*Table III*

| Sequestering Agent | Citric Acid | Oxalic Acid |
|---|---|---|
| Presence of Ammonia | No | No |
| Platinum, wt. percent | 0.641 | 0.640 |
| Chloride, wt. percent | 0.15 | 0.15 |
| Fluoride, wt. percent | 0.41 | 0.46 |
| Octane Rating, Research Method | 94.8 | 95.2 |
| Total Gas Yield, s.c.f./bbl [1] | 1,261 | 1,163 |

[1] The total quantity of gas, being those light paraffins having four carbon atoms or less, plus the excess hydrogen produced during the process, is directly related to the yield of liquid hydrocarbons having the octane rating indicated.

Example III illustrates the advantage afforded through the use of oxalic acid, the preferred sequestering agent, in that a substantial decrease in the quantity of the light material produced was effected, resulting in an increase in the volume of liquid hydrocarbons obtained with an increase in the octane rating of the product. This is especially significant in view of the fact that an increase in octane rating generally requires more severe operating conditions which are effected at the cost of the liquid product desired.

The foregoing examples and specification clearly illustrate the benefits afforded through the utilization of the method of the present invention whereby a more active catalyst is produced which effects high product quality in substantially greater yields than heretofore were obtained.

We claim as our invention:

1. A method for manufacturing a noble metal component-refractory inorganic oxide catalyst which comprises commingling an organic sequestering agent, selected from the group consisting of citric, oxalic, tartaric, acetic and tetra-acetic acids, with said refractory inorganic oxide in a weight ratio of said sequestering agent to said noble metal component of from about 1:2 to about 3:1 and in the presence of ammonia in an amount to increase the pH of the resulting mixture to a level of about 3.5.

2. The method of claim 1 further characterized in that said refractory inorganic oxide comprises alumina.

3. The method of claim 1 further characterized in that said noble metal component comprises palladium.

4. The method of claim 1 further characterized in that said noble metal component comprises platinum.

5. A method for manufacturing an alumina-platinum catalyst which comprises commingling an organic sequestering agent, selected from the group consisting of citric, oxalic, tartaric, acetic and tetra-acetic acids, with said alumina in a weight ratio of said sequestering agent to said platinum of from about 1:2 to about 3:1 and in the presence of ammonia in an amount to increase the pH of the resulting mixture to a level of about 3.5, adding thereto an aqueous solution of chloroplatinic acid, drying the resulting mixture of a temperature of from about 100° F. to about 210° F. and thereafter subjecting said mixture to air oxidation effected at a temperature of from about 800° F. to about 1200° F.

6. The method of claim 5 further characterized in that said organic sequestering agent comprises citric acid.

7. The method of claim 5 further characterized in that said organic sequestering agent comprises oxalic acid.

8. A method of manufacturing alumina-platinum catalyst which comprises commingling an aqueous solution of chloroplatinic acid with an aqueous solution of oxalic acid in a weight ratio of oxalic acid to platinum of from about 1:2 to about 3:1 in the presence of ammonia in an amount to increase the pH of the resulting chloroplatinic acid-oxalic acid mixture to a level of about 3.5, combining the resulting mixture with alumina, drying the alumina-platinum composite at a temperature of from about 100° F. to about 210° F. and thereafter subjecting the dried composite to air-oxidation at a temperature of from about 800° F. to about 1200° F.

References Cited in the file of this patent

UNITED STATES PATENTS

| | | |
|---|---|---|
| 2,566,521 | Haensel | Sept. 4, 1951 |
| 2,658,028 | Haensel et al. | Nov. 3, 1953 |
| 2,739,946 | Guyer et al. | Mar. 27, 1956 |
| 2,753,310 | Riedl | July 3, 1956 |
| 2,769,688 | Milliken et al. | Nov. 6, 1956 |
| 2,840,532 | Haensel | June 24, 1958 |